UNITED STATES PATENT OFFICE.

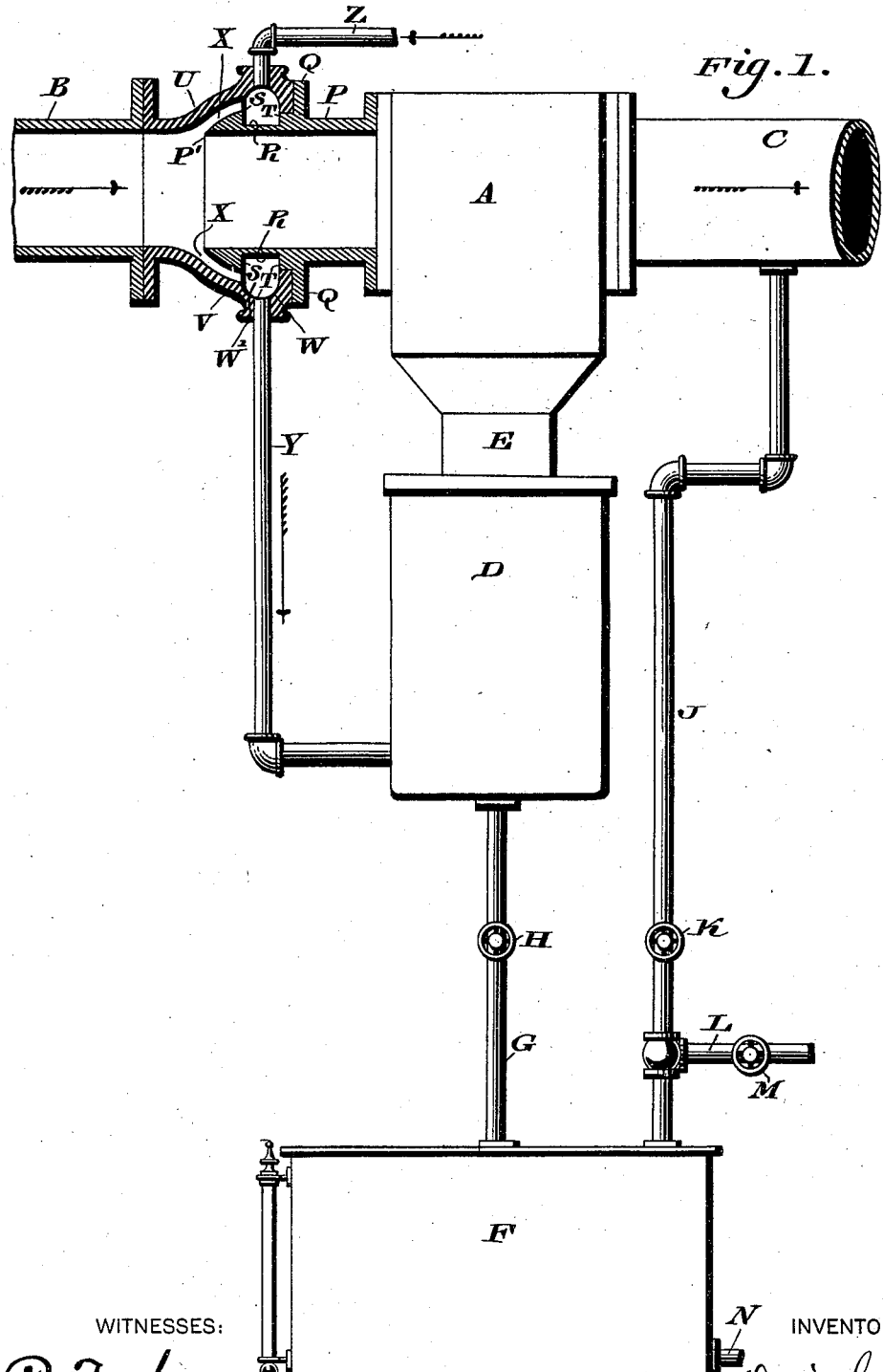

DAVID COCHRANE, OF PHILADELPHIA, PENNSYLVANIA, ASSIGNOR TO HARRISON SAFETY BOILER WORKS, OF SAME PLACE.

ATTACHMENT FOR STEAM-SEPARATORS.

SPECIFICATION forming part of Letters Patent No. 557,109, dated March 31, 1896.

Application filed August 31, 1895. Serial No. 561,064. (No model.)

*To all whom it may concern:*

Be it known that I, DAVID COCHRANE, a citizen of the United States, residing in the city and county of Philadelphia, State of Pennsylvania, have invented a new and useful Improvement in Attachments for Steam-Separators, which improvement is fully set forth in the following specification and accompanying drawing.

My invention has relation to the separation of oil from steam or any other liquid in a gaseous condition, and is especially applicable for separating oil from exhaust-steam coming from a cylinder that is jacketed with steam at a higher temperature than the steam in the engine-cylinder; and I have found by experiment that by obtaining a small percentage of water in the steam-conduit, either by condensing part of the steam by cooling off a suitable portion of the exhaust-conduit before the same reaches the separator or by introducing in the novel manner hereinafter described the proper amount of water directly into the inlet pipe or conduit in such a way that substantially all of it will come in contact with the inner surface of said pipe, so as to condense that portion of the steam directly in contact with said surface, the condensed steam and water so formed will mix with the oil and become commingled therewith, thereby destroying its adhesive qualities to a great extent, and so giving a tangible body for the baffle-plates within the separator to act upon, thus enabling any good separator to effectively purify steam containing oil after the same has been treated as above described; and to this end my invention consists in providing the steam-inlet pipe of the separator with a suitable trap or compartment, which extends around the interior of the inlet-pipe and which is adapted to receive water or other cooling fluid in such a way that an effective condensation will take place and the water and oil contained in the incoming steam will be effectively separated therefrom, the passage to said trap being slightly deflected from the path of the incoming steam.

It further consists in the combination of a device of the character described with a steam-separating apparatus forming the subject of a prior patent granted to me.

It further consists of novel details of construction, all as will be hereinafter fully set forth.

The figure represents a side elevation, partly in section, of an attachment for a steam-separator and its adjuncts embodying my invention.

Similar letters of reference indicate corresponding parts in the figure.

Referring to the drawing, A designates a separator, which may be of any convenient construction, although the form of the same is preferably that shown in prior patents granted to me in this same class of invention.

B designates the inlet-pipe; C, the outlet-pipe, and D the drip-well, which communicates with the separator A through the neck E.

F designates a tank, which is in communication with the well D through the medium of a pipe G, in which is located the valve H.

J designates a pipe leading from the upper portion of the tank F to the outlet-pipe C, said pipe J having a valve K therein.

L designates a pipe leading from said pipe J at a point between the valve K and the tank F, said pipe L being provided with a valve M.

N designates an outlet-pipe leading from the lower portion of the tank F.

P designates a pipe-section, which has one end suitably connected to the separator A, while the other end is provided with a flange Q and has a portion extended to the other side thereof, in which is located the recess R, the same being provided with the walls S and T, the extremity P' of said pipe P, which terminates in the path of the incoming steam, being of substantially conical or similar shape.

U designates a fitting or pipe-section whose construction will be apparent from the figure, the same having an enlarged portion V and an annular interior channel or gutter W, which, when the parts are assembled, is adjacent said recess R, a chamber or trap W' thus being formed, to which access is had from the interior of the steam-inlet pipe through the medium of the passage X, it being evident that the above may be made in one casting, if desired.

Y designates a pipe leading from the under side of said trap or chamber W' to the lower portion of the well D, said pipe serving to conduct the oil and water into said well.

Z designates an inlet-pipe leading into said chamber W', whereby water or other cooling fluid may be conducted thereinto.

The operation is as follows: The incoming steam which contains the oil and other impurities enters the pipe B, and the oil, which has a tendency to travel along the interior surface or periphery of the inlet pipe or conduit B, will be intercepted by the extremity P when the same is reached, and will thus be caused to travel by means of the passage X into the compartment or trap W', at which point it will be subjected to the influence of the water or other cooling fluid which enters through the pipe Z, and a slight condensation will take place, said water, oil, &c., being collected in the trap W' and afterward carried off by the drain-pipe Y into the well D, and the remaining impurities contained in the steam will be effectively removed by means of the baffle-plates or other obstructions in the interior of the separator A.

The operation of the valves and the connections H G J K L M, &c., is the same as has already been described in the prior patent, No. 538,868, granted to me in the same class of invention on the 7th day of May, 1895, and does not need to be referred to in detail here.

It will be understood that the above apparatus is in the nature of an improvement upon a contemporaneously pending application filed by me June 25, 1895, Serial No. 553,972, and it will further be apparent that the construction shown in the figure is especially adapted for use in locations where only a limited supply of water is to be had.

Having thus described my invention, what I claim as new, and desire to secure by Letters Patent, is—

1. A steam-separator, an inlet-pipe therefor having a chamber or trap located within the same, and in communication with a current of incoming steam, a connection therefrom to the drip-well of the separator, and an inlet-pipe for introducing a cooling fluid into said trap, substantially as described.

2. The steam-separator A having inlet-pipes B, U, and P, a chamber or trap W' formed between the two latter, said chamber being in communication with the inlet-pipe B by means of the passage X, the inlet-pipe Z and the outlet-pipe Y leading to the drip-well of the separator, substantially as described.

3. The steam-separator A, inlet and outlet pipes B and C, the drip-well D in communication with said separator, a tank F in communication with said drip-well, the valved connections G, J, and L, the pipe-sections U and P, means for holding the same in position, the trap W', a passage X in communication therewith, and with the inlet-pipe, a water-inlet Z, and a drain-pipe Y connecting said trap and drip-well, substantially as described.

4. In a device of the character described, an inlet-pipe, a pipe projecting thereinto and having its edge in the path of the incoming steam, and a chamber or trap adjacent said edge, in combination with a passage leading into the inlet-pipe therefrom, and means for introducing a cooling fluid into said chamber, substantially as described.

DAVID COCHRANE.

Witnesses:
JOHN A. WIEDERSHEIM,
E. HAYWARD FAIRBANKS.